(12) United States Patent
Ruetz

(10) Patent No.: US 7,800,357 B2
(45) Date of Patent: Sep. 21, 2010

(54) STEERING ANGLE SENSOR

(75) Inventor: Christian Ruetz, Ludwigsburg (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 1107 days.

(21) Appl. No.: 10/585,585

(22) PCT Filed: Jan. 13, 2005

(86) PCT No.: PCT/EP2005/000238

§ 371 (c)(1),
(2), (4) Date: Jul. 10, 2006

(87) PCT Pub. No.: WO2005/068942

PCT Pub. Date: Jul. 28, 2005

(65) Prior Publication Data

US 2009/0188743 A1    Jul. 30, 2009

(30) Foreign Application Priority Data

Jan. 20, 2004    (DE) .................. 10 2004 004 023

(51) Int. Cl.
*G01B 7/30*    (2006.01)
*G01M 17/06*    (2006.01)
(52) U.S. Cl. .................. 324/207.25; 73/117.02
(58) Field of Classification Search ............ 324/207.15, 324/207.2, 207.21, 207.22, 207.23, 207.24, 324/207.25, 173, 174; 73/117.02
See application file for complete search history.

(56) References Cited

U.S. PATENT DOCUMENTS 5,646,523 A * 7/1997 Kaiser et al. .............. 324/207.2

| 5,880,367 | A  | * | 3/1999  | Vaughn .................... 73/488 |
| 6,512,366 | B2 | * | 1/2003  | Siess ..................... 324/207.25 |
| 7,307,415 | B2 | * | 12/2007 | Seger et al. ............... 324/207.2 |
| 2003/0218458 | A1 |   | 11/2003 | Seger |
| 2004/0004471 | A1 |   | 1/2004  | Haas |
| 2004/0145364 | A1 | * | 7/2004  | Onishi et al. ............. 324/207.2 |
| 2004/0217758 | A1 | * | 11/2004 | Leonard ................... 324/207.2 |

FOREIGN PATENT DOCUMENTS

| DE | 44 09 892  | 9/1995 |
| DE | 195 34 995 | 3/1997 |
| DE | 198 18 799 | 6/1999 |
| DE | 199 00 330 | 7/1999 |
| DE | 199 36 211 | 2/2000 |
| DE | 199 36 246 | 2/2001 |
| EP | 0 477 653  | 4/1992 |

* cited by examiner

*Primary Examiner*—Kenneth J Whittington
(74) *Attorney, Agent, or Firm*—Paul Vincent

(57) ABSTRACT

A steering angle sensor comprises a main rotor which can be rotated in a rotationally synchronous manner and which can be coupled to a steering column or to a steering wheel. The main rotor can be rotated about the rotational axis of the steering column. The steering angle sensor also comprises at least one additional rotor which can be driven by the main rotor, a first scanning unit which is used to scan the position of the rotational angle of the main rotor, and a second scanning unit which is used to scan the rotational angle of the additional rotor. The additional rotor can be rotated about the rotational axis of the steering column and can drive the additional rotor of at least one transmission element driven by the main rotor. A method for determining the absolute steering angle of a steering wheel is also disclosed.

22 Claims, 4 Drawing Sheets

| $\alpha_0$ [Grad] | $w_{r2}$ | $\alpha_0$ [Grad] | $w_{r2}$ | $\alpha_0$ [Grad] | $w_{r2}$ | $\alpha_0$ [Grad] | $w_{r2}$ |
|---|---|---|---|---|---|---|---|
| 0 | 0 | 96 | 140 | 192 | 130 | 288 | 120 |
| 24 | 110 | 120 | 100 | 216 | 90 | 312 | 80 |
| 48 | 70 | 144 | 60 | 240 | 50 | 336 | 40 |
| 72 | 30 | 168 | 20 | 264 | 10 | 360 | 0 |

STEERING ANGLE SENSOR

This application is the national stage of PCT/EP2005/000238 filed on Jan. 13, 2005 and also claims Paris Convention priority of DE 10 2004 004 023.0 filed on Jan. 20, 2004.

BACKGROUND OF THE INVENTION

The invention concerns steering angle sensors comprising a main rotor which can be coupled to a steering column or steering wheel to be rotated synchronously therewith, and at least one additional rotor which can be driven by the main rotor, a first scanning unit for scanning the rotational angle position of the main rotor, and a second scanning unit for scanning the rotational angle of the additional rotor.

There are conventional steering angle sensors which are based on an optical principle. A steering angle sensor of this type may comprise a rotor with code discs whose code can be scanned by a scanning unit. The code of the code discs is usually realized by teeth of different width with intermediate gaps. The teeth or the gaps can be detected by optical means, in particular, by photocells. The code for determining the rotational angle position of the steering wheel can only achieve a resolution on the order of magnitude of approximately 1.5° due to manufacturing limits.

The use of optical means is also disadvantageous since, after long operating times, in particular when used in a vehicle, the optical means are subject to wear due to soiling. The production of code discs is moreover relatively demanding.

In order to improve the resolution, DE 101 10 785 A1 proposes use of a counting wheel which is driven by a rotor having a code disk. The rotational angular position of the counting wheel may be set by two magnetic field sensors disposed at an angular offset with respect to each other of 90° and be used for calculating the absolute steering wheel angle. This embodiment improves the above-mentioned resolution by a factor of approximately 2.

DE 195 06 938 A1 discloses a steering angle sensor for driving two additional rotors using a main rotor, wherein the rotational angular position of the additional rotors can be detected by sensors. The angular position of the main rotor can be mathematically detected via the rotational angular position of the additional rotors driven by the rotor. A resolution of up to 0.1° can thereby be achieved.

DE 195 06 938 A1 is disadvantageous in that at least two rotational bodies are required, in addition to the rotor. These require a relatively large amount of space. Moreover, the rotational bodies must be driven by the driver of a vehicle provided with such a steering angle sensor, which either increases the required actuation forces or requires increased steering support.

Departing therefrom, it is the underlying purpose of the present invention to provide a compact steering angle sensor with maximum resolution.

SUMMARY OF THE INVENTION

This object is achieved in accordance with the invention in that the additional rotor can be rotated about the axis of rotation of the steering column and at least one gear member driven by the main rotor is provided for driving the additional rotor.

The inventive design provides a steering angle sensor which requires particularly little space. In contrast to prior art, the additional rotor does not extend outside of the steering column but utilizes the space around the steering column. This reduces the radial extension of the inventive steering angle sensor to a minimum. This is advantageous in particular in view of the possible installation locations of a steering angle sensor. A steering angle sensor may be disposed next to or within the steering wheel, wherein the tendency to accommodate an increasing number of actuating elements for driving or comfort functions in the steering wheel, reduces the space available for the steering angle sensor. Even when the steering angle sensor is installed in a position remote from the steering wheel (e.g. in the region of the steering gear), there is only little space available, in particular in small vehicles.

Since two rotors can be scanned despite the compact structure of the inventive steering angle sensor, good resolution can also be achieved with the use of scanning units based on an optical principle. In this manner, the inventive steering angle sensor meets both the requirement for "compact structure" and "good resolution".

The steering angle sensor may comprise an evaluation unit for evaluating the output signals of the scanning units. It may also be integrated in an electronic unit which monitors and/or controls further vehicle functions.

In one embodiment of the invention, the axis of rotation of the main rotor is coaxial to the axis of rotation of the steering column, permitting direct coupling of the main rotor to the steering column and/or the steering wheel and/or a steering wheel housing. The axis of rotation of the additional rotor may correspondingly be disposed coaxially to the axis of rotation of the steering column.

Irrespective of whether one or both axes of rotation of the main and the additional rotor are disposed coaxially to the axis of rotation of the steering column, the axis of rotation of the main rotor and the axis of rotation of the additional rotor may be coaxial or offset relative to each other. In this fashion, various transmission ratios may be flexibly taken into consideration which result from the coupling between main rotor, gear member and additional rotor.

The gear member may comprise a drive section to be driven by the main rotor and a drive section for driving the additional rotor. The driving and driven section may e.g. each be formed by a toothing, which yields multi-stage transmission by one gear member.

The transmission ratio of the gear chain of main rotor, gear member and additional rotor advantageously has a numerical value which is a positive real number, but not a positive integer. The ratio should, in particular, not be 1. An integer transmission ratio may pose the problem that the signals generated by the different magnetic field sensor configurations in different rotational angular positions of the main rotor and additional rotor are identical, such that an assessment of the absolute steering wheel position is ambiguous. This problem is solved by the use of transmission ratios having non-integer values.

In order to achieve good steering angle sensor resolution, the main rotor and additional rotor preferentially have magnet sections which extend over an angular range with sectors of different polarity, and both scanning units comprise magnetic field sensor configurations whose output signals can be supplied to the evaluation unit to determine the absolute steering wheel angle. This avoids use of optical means, in particular, code discs and photocells. A steering angle sensor is provided which is resistant to wear and provides reliable function even under increased soiling by using magnetic field sensor configurations instead of optical means.

A magnetic field sensor configuration denotes a magnetic field sensor or a plurality of magnetic field sensors. The at least one magnetic field sensor may be designed as a Hall sensor or magnetoresistive sensor.

The sectors of a magnetic section advantageously assume the same angle. The magnetic field sensor configurations can therefore generate uniform, wavy output signals. The magnet section may e.g. assume an angle of 12° and comprise two sectors designed as north and south poles, each having an angle of 6°.

The main rotor and/or the additional rotor advantageously comprise at least two magnet sections. A rotational body is conventionally provided with a magnet section comprising sectors of different polarity and each extending through an angle of 180°. The accuracy of the rotational angle detection of the main rotor and/or the additional rotor may be increased by using several magnet sections. In this fashion, the main rotor may comprise at least 5, in particular 15 magnet sections and the additional rotor at least 4, in particular 12 magnet sections, which may, in turn, be uniformly distributed about a circle. With this measure, the output signals of the magnetic field sensor configurations are made uniform.

A magnetic field sensor configuration advantageously comprises at least one analog magnetic field sensor. The output signals of the magnetic field sensors can thereby be evaluated not only with regard to whether they exceed or fall below a threshold value. Moreover, an analog output signal which corresponds e.g. to a certain voltage value can be evaluated, which obtains higher resolution as compared to use of digital magnetic field sensors. The analog signal can also, of course, be evaluated using analog/digital converters. The number of bits should thereby be sufficiently large, e.g. 8 bits, to obtain resolutions of approximately 0.1°.

A magnetic field sensor configuration advantageously comprises two magnetic field sensors which are mutually offset. These sensors may e.g. be mutually offset by half the angular range occupied by a sector of a magnet section. If a magnet section assumes e.g. an angle of 12° and the sectors of this magnet section each assume an angle of 6°, the magnetic field sensors may be mutually offset by 3°. This configuration permits detection of a sinusoidal signal by a first magnetic field sensor of the magnetic field sensor configuration, while the second magnetic field sensor, which is offset from the first sensor, can detect a cosine signal. These signals may be supplied to the evaluation unit, where they can be used to determine the absolute steering wheel angle.

The magnet sections may be provided along the outer periphery of the main rotor and/or the additional rotor, and the magnetic field sensor configurations may be radially offset from the magnet sections. With this configuration, the steering angle sensor may have a particularly flat construction.

The magnet sections may also be provided about a circle disposed concentrically to the axis of rotation of the main rotor and/or the additional rotor, and the magnetic field sensor configurations may be axially offset from the magnet sections. This construction minimizes the radial extension of the steering angle sensor.

The invention also concerns a method for determining the absolute steering wheel angle of a steering wheel. The absolute steering wheel angle may be determined for one rotation of the steering wheel within an interval of 0° to 360° and for several steering wheel rotations within a multiple of an interval of 0° to 360°.

BRIEF DESCRIPTION OF THE DRAWING

Further advantageous embodiments and details of the invention can be extracted from the following description which describes and explains the invention with reference to the embodiments shown in the drawing.

FIG. 2b shows a section through a second embodiment of an inventive steering angle sensor corresponding to FIG. 2a;

DESCRIPTION OF THE PREFERRED EMBODIMENT

Figure 1:
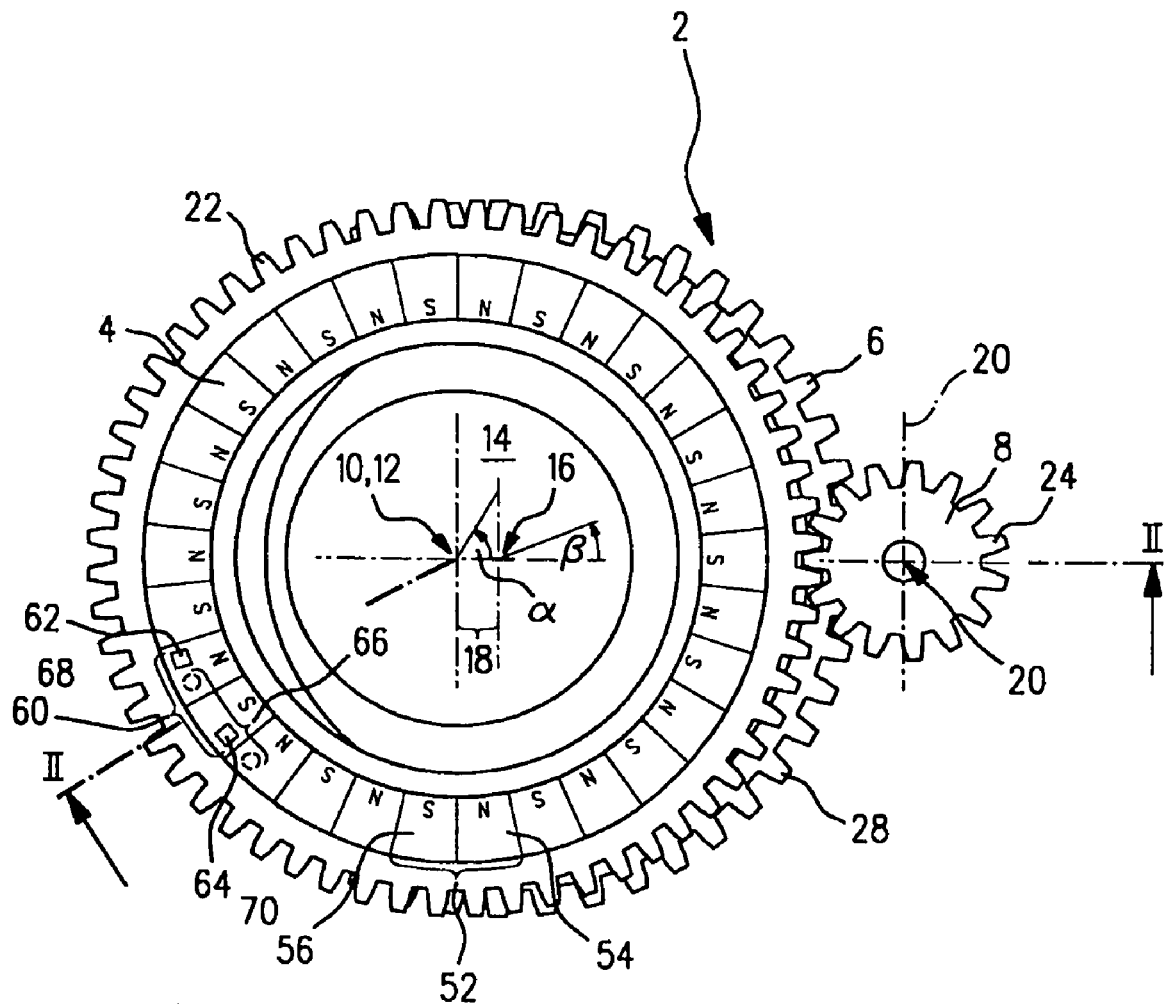
FIG. 1 shows a top view of a first embodiment of an inventive steering angle sensor.

FIG. 1 shows a steering angle sensor designated in total with reference numeral 2. It comprises a substantially disc-shaped main rotor 4 and a substantially disc-shaped additional rotor 6. A gear member 8 is also provided forming a gear chain together with main rotor 4 and additional rotor 6.

Figure 2A:
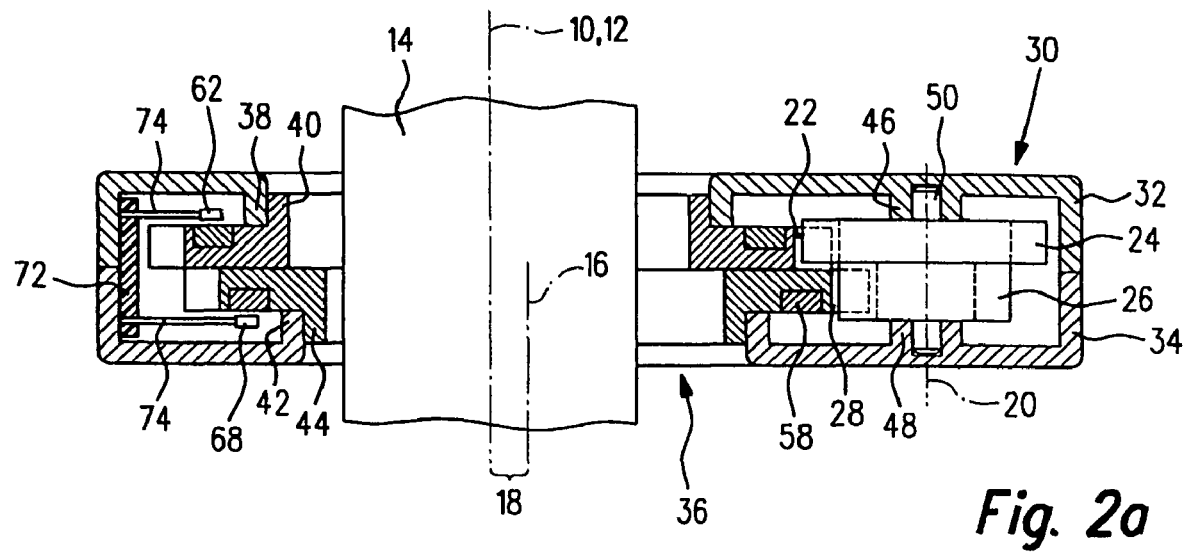
FIG. 2a shows a section through the steering angle sensor in accordance with II-II of FIG. 1.

The main rotor 4 rotates about an axis of rotation 10 which is disposed coaxially to the axis of rotation 12 of a steering column 14 (also shown in FIG. 2a). The axis of rotation 16 of the additional rotor 6 is offset from the axis of rotation 12 of the steering column 14 and from the axis of rotation 10 of the main rotor 4 by an amount 18. The gear member 8 rotates about an axis of rotation 20.

The main rotor 4 comprises an outer toothing 22 which mates with a drive section 24 of the gear member 8. The drive section 24 is formed by a toothed wheel (also shown in FIG. 2a). The gear member 8 moreover comprises a driven section 26 which is also designed as toothed wheel and mates with a toothing 28 of the additional rotor 6.

The main rotor 4, the additional rotor 6 and the gear member 8 are disposed in a housing 30 which is only shown in FIG. 2a. It comprises an upper housing part 32 and a lower housing part 34. Both housing parts 32 and 34 define an opening 36 through which the steering column 14 extends. The upper housing part 32 forms a guiding collar 38 in the region of the opening 36 for an annular step 40 of the main rotor 4, through which the main rotor 4 is guided on the housing 30. The lower housing part 34 correspondingly comprises a guiding collar 42 for an annular step 44 of the additional rotor 6, which is thereby borne on the housing 30. The housing 30 also comprises bearing receptacles 46 and 48 for a bearing pin 50 which is connected to the drive section 24 and the driven section 26 of the gear member 8 for secure rotation therewith.

The main rotor 4 has magnet sections 52 distributed about a circle, wherein north sectors 54 and south sectors 56 are disposed in an alternating fashion. A magnet section 52 is formed by a north sector 54 and a south sector 56. The additional rotor 6 also comprises magnet sections 58 with north and south sectors disposed about a circle.

The magnet sections 52 of the main rotor 4 are associated with a magnetic field sensor configuration 60 comprising a first magnetic field sensor 62 and a second magnetic field sensor 64. A second magnetic field sensor configuration 66 is moreover provided which is associated with the additional rotor 6. It comprises a first magnetic field sensor 68 which is also shown in FIG. 2a and a second magnetic field sensor 70 which is covered in the configuration of FIG. 1 and is therefore shown in broken lines.

FIG. 2a shows that the magnetic field sensors (62 and 68) are connected to a circuit board 72 via connecting elements 74, wherein the magnetic field sensors 62 and 68, the connecting elements 64, and the circuit board 72 are received within the housing 30.

Figure 2B:
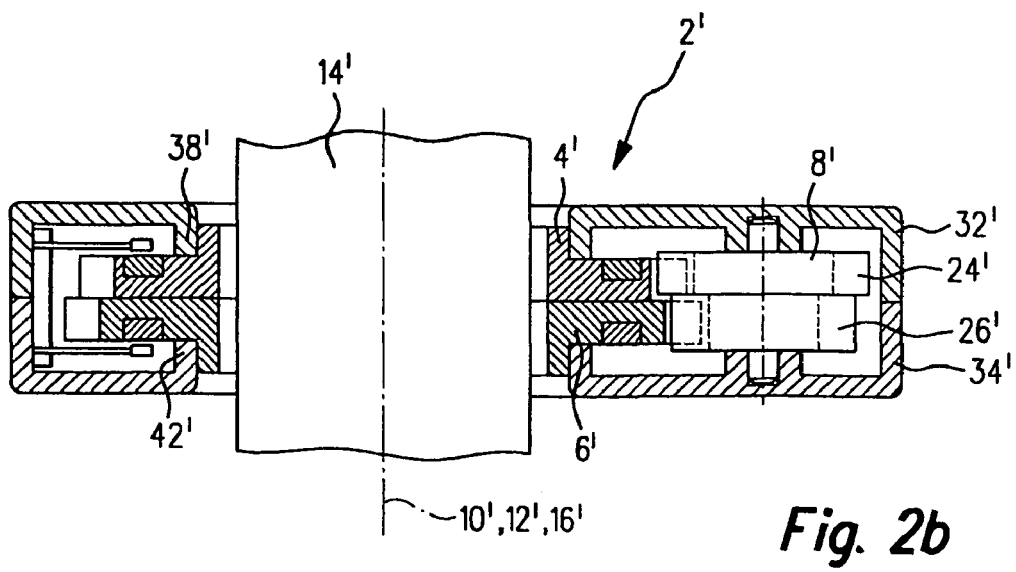

FIG. 2b shows a second embodiment of a steering angle sensor 2' which also comprises a main rotor 4', an additional rotor 6', and a gear member 8'. In contrast to the steering angle sensor 2 of FIGS. 1 and 2a, the axis of rotation 10' of the main rotor 4', the axis of rotation 16' of the additional rotor 6' and the axis of rotation 12' of the steering column 14' are disposed coaxially relative to each other. The drive section 24' and the driven section 26' of the gear member 8' are adjusted to the toothing geometry of the main rotor 4' or the additional rotor 6'. The guiding collars 38' and 42' of the housing parts 32' and 34' are disposed in mutual alignment.

Figure 3A:
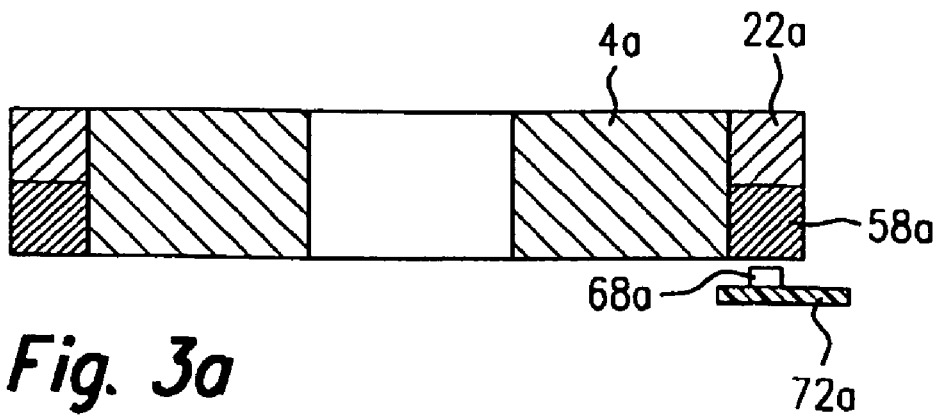
FIGS. 3a through 3c show alternative configurations of magnet sections and magnetic field sensors.
Figure 3B:
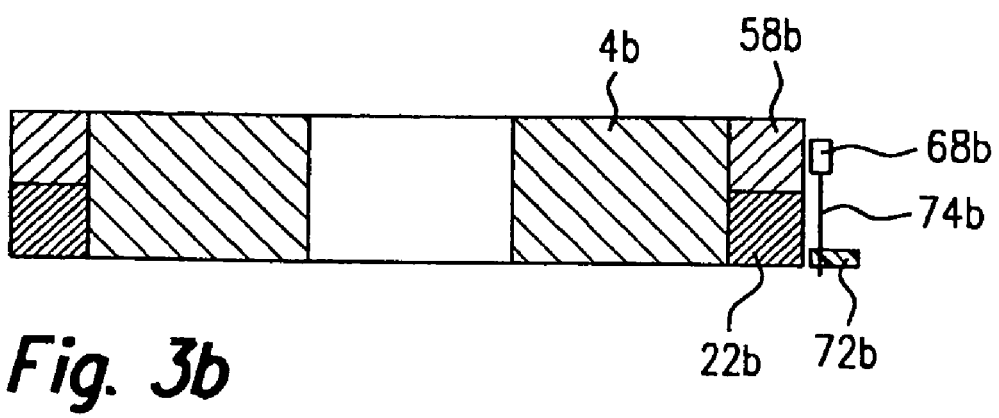
Figure 3C:
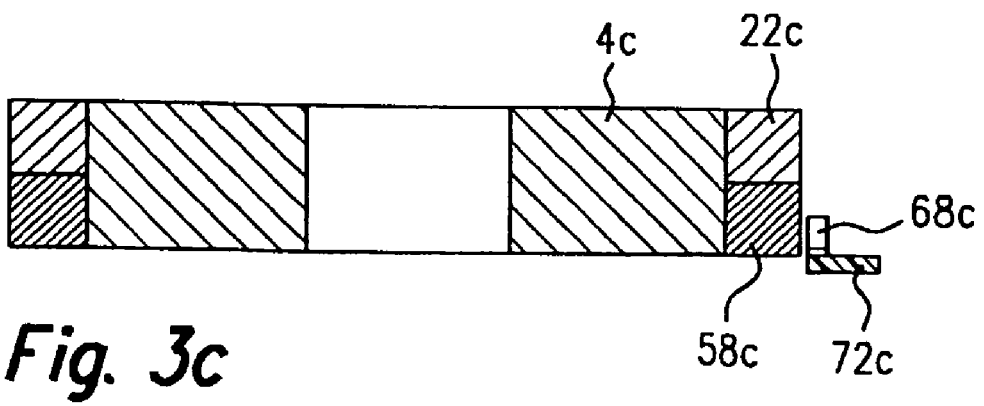

FIGS. 3a through 3c show alternative embodiments for feasible configurations of magnet sections and magnetic field sensors using rotors 4a through 4c shown in a simplified form, wherein the configurations shown are to be taken as examples for an additional rotor 4. The configurations of FIGS. 3a through 3c could be designed mirror-symmetrically for a main rotor 6.

FIG. 3a shows magnet sections 58a about an outer periphery of the rotor 4a. Corresponding magnetic field sensors (the magnetic field sensor 68a is shown) are axially offset from the magnet sections 58a.

The magnetic field sensor 68a is disposed on a circuit board 72a.

In accordance with FIG. 3b, magnet sections 58b are also provided about an outer periphery of a rotor 4b. Corresponding magnetic field sensors (magnetic field sensor 68b is shown) are disposed radially outside of the rotor 4b. The magnetic field sensor 68b is connected to a circuit board 72b via a connecting element 74b.

The configuration of FIG. 3c corresponds substantially to the configuration of FIG. 3b, wherein no connecting element between the magnetic field sensor 68c and the circuit board 72c is used.

Figures 4, 5:
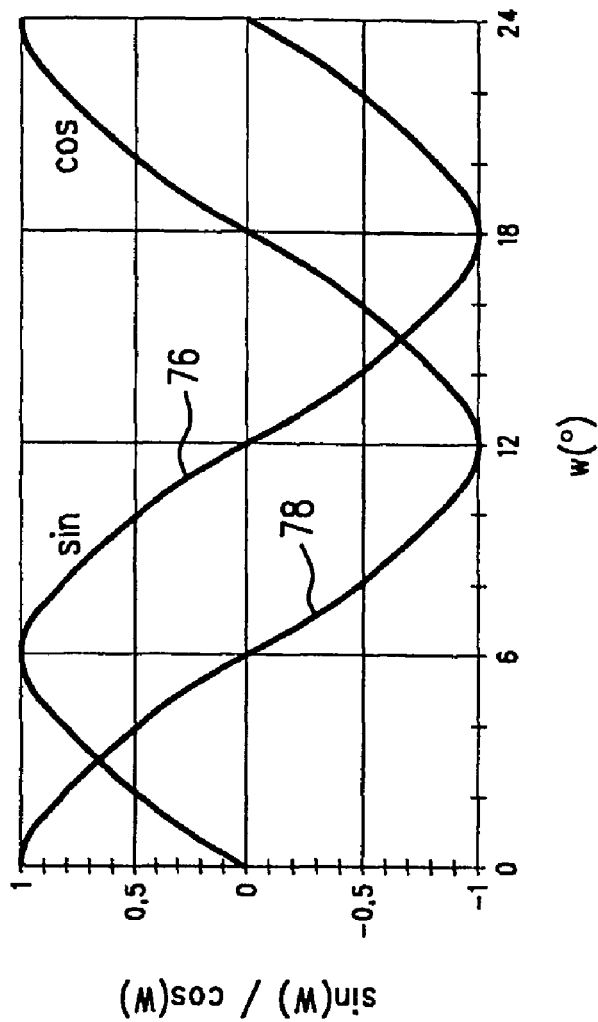
FIG. 4 shows output signals generated by a magnetic field sensor.
FIG. 5 shows an overview in tabular form for analyzing the asynchronous signal periods of main rotor and additional rotor of the steering angle sensor.

FIG. 4 shows the output signals of the magnetic field sensor configuration 60. The sinusoidal signal 76 corresponds to the output signal of the magnetic field sensor 62. The cosine signal 78 corresponds to the output signal of the magnetic field sensor 64. The signals 76 and 78 are mutually offset by 6°. Corresponding signals may be generated by the magnetic field sensors 68 and 70 of the magnetic field sensor configuration 66.

The embodiment is explained below with reference to real numerical examples.

The number of teeth of the main rotor 4 is $z_{r1}=60$. The number of teeth of the additional rotor 6 is $z_{r2}=48$. The number of teeth of the drive section 24 of the gear member 8 is $z_{g1}=15$ and that of the driven section 26 $z_{g2}=26$. The transmission ratio of the gear chain formed by main rotor 4, gear member 8 and additional rotor 6 is therefore $$\ddot{u} = \frac{z_{r1}}{z_{g1}} * \frac{z_{g2}}{z_{r2}}$$
$$= \frac{60}{15} * \frac{26}{48}$$
$$= 2.167$$

The main rotor 4 comprises 15 magnet sections 52 occupying an angle $\alpha_{pr1}$ of 24° each. Each sector 54 and 56 of a magnet section 52 occupies an angle of 12°. The signal behavior shown in FIG. 4 is therefore repeated with each rotation of the main rotor 4 a total of $p_{r1}=15$ times.

The additional rotor comprises 12 magnet sections 58 occupying an angle $\beta_{pr2}$ of 30° each. Each sector of a magnet section 58 occupies an angle of 15°. The signal behavior sensed by the magnetic field sensor configuration 66 is therefore repeated a total of $p_{r2}=12$ times during one rotation of the additional rotor 6.

The resolution $\alpha_{ar1}$ of the magnetic field sensor configuration 60 is 0.1°. The total number of electronic signal values per signal passage for the main rotor 4 is therefore $$W_{r1(ges)} = \frac{\alpha_{pr1}}{\alpha_{ar1}}$$
$$= \frac{24°}{0.1°}$$
$$= 240$$

The resolution $\beta_{ar2}$ of the magnetic field sensor configuration 66 is 0.2°. Thus, the overall number of electronic signal values per signal passage for the additional rotor 6 is $$W_{r2(ges)} = \frac{\beta_{pr2}}{\beta_{ar2}}$$
$$= \frac{30°}{0.2°}$$
$$= 150$$

The number of 240 or 150 signal values can be represented by 8 bits ($2^8$ signal values=256>240>150).

The signal angle of the periodic signal of the additional rotor 6 which is determined from the angle of rotation of the main rotor 4 is $$\epsilon_{r2}=p_{r2}*\beta_{r2}=p_{r2}*\ddot{u}*\alpha_{r1}$$

Each signal angle may be associated with a corresponding electronic signal value:

$$w_{r2} = \frac{\epsilon_{r2}}{360°} * w_{r2(ges)}$$

In accordance with the table of FIG. 5, different angles $\alpha_0$ are associated with signal values $w_{r2}$ (during zero passage of the periodic signal behavior of the main rotor 4), which correspond to the signal angles of the additional rotor 6. A signal value $w_{r2}$ is within an interval of 0 to 150 ($w_{r2(ges)}$). The table shows that the signal values $w_{r2}$ of the additional rotor 6 differ for periodically repeating signal values of the main rotor 4 by at least 10 signal values. For this reason, any angle within 360° can be unambiguously detected.

I claim:

1. A steering angle sensor for measuring a steering angle of a steering wheel mounted to a steering column, the steering column having an axis of rotation, the sensor comprising:
a main rotor, said main rotor coupled to the steering column or to the steering wheel for synchronous rotation therewith about the steering column axis of rotation, said main rotor being disposed, structured and dimensioned to surround the steering column;
at least one additional rotor disposed for rotation about the steering column axis of rotation, said additional rotor being disposed, structured and dimensioned to surround the steering column;

a first scanning unit for scanning a rotational angular position of said main rotor;

a second scanning unit for scanning a rotational angular position of said additional rotor; and at least one gear member cooperating between said main rotor and said additional rotor, said gear member being driven by said main rotor and driving said additional rotor, wherein an axis of rotation of said main rotor and an axis of rotation said additional rotor are mutually offset.

2. The steering angle sensor of claim 1, further comprising an evaluation unit for determining the rotational angular position of said main rotor and the rotational angular position of said additional rotor.

3. The steering angle sensor of claim 2, wherein said main rotor and said additional rotor each comprise magnet sections extending over an angular region and having sectors of different polarities, wherein said first and said second scanning units each comprise a magnetic field sensor configuration having output signals supplied to said evaluation unit to determine an absolute steering wheel angle.

4. The steering angle sensor of claim 3, wherein said sectors of said magnet section occupy a same angle.

5. The steering angle sensor of claim 3, wherein said main rotor and/or said additional rotor comprise at least two magnet sections.

6. The steering angle sensor of claim 3, wherein said main rotor comprises at least 5 or 15 magnet sections and said additional rotor comprises at least 4 or 12 magnet sections.

7. The steering angle sensor of claim 3, wherein said magnet sections are uniformly distributed about a circle.

8. The steering angle sensor of claim 3, wherein said magnetic field sensor configuration comprises at least one analog magnetic field sensor.

9. The steering angle sensor of claim 3, wherein said magnetic field sensor configuration comprises two magnetic fiell sensors which are mutually offset.

10. The steering angle sensor of claim 3, wherein said magnetic field sensors are mutually offset by half an angular region occupied by one said sector.

11. The steering angle sensor of claim 3, wherein said magnet sections are disposed about an outer periphery of said main rotor and/or said additional rotor and said magnetic field sensor configurations are radially offset from said magnet sections.

12. The steering angle sensor of claim 3, wherein said magnet sections are disposed about a circle which is concentric relative to an axis of rotation of said main rotor and/or an axis of rotation of said additional rotor, said magnetic field sensor configurations being axially offset from said magnet sections.

13. The steering angle sensor of claim 1, wherein an axis of rotation of said main rotor is coaxial to the axis of rotation of the steering column.

14. The steering angle sensor of claim 1, wherein an axis of rotation of said additional rotor is coaxial to the axis of rotation of the steering column.

15. The steering angle sensor of claim 1, wherein an axis of rotation of said main rotor and an axis of rotation of said additional rotor are coaxial with respect to each other.

16. The steering angle sensor of claim 1, wherein said main rotor and said additional rotor are disposed substantially parallel to each other.

17. The steering angle sensor of claim 1, wherein said gear member comprises a drive section to be driven by said main rotor and a driven section for driving said additional rotor.

18. The steering angle sensor of claim 1, wherein a transmission ratio of a gear chain comprising said main rotor, said gear member, and said additional rotor is not equal to 1.

19. The steering angle sensor of claim 1, wherein a transmission ratio of a gear chain comprising said main rotor, said gear member, and said additional rotor has a numerical value which is a positive real number but not a positive integer.

20. A method for determining an absolute steering wheel angle a steering wheel cooperating with a steering column coupled with the steering angle sensor of claim 1, the method comprising the steps of:

detecting, using the first scanning unit, a rotational angular position the main rotor, the main rotor being coupled to the steering column for synchronous rotation therewith, the main rotor disposed for rotation about an axis of rotation of the steering column;

detecting, using the second scanning unit, a rotational angular position of the additional rotor, the additional rotor disposed for rotation about the axis of rotation of the steering column, the additional rotor being driven by the gear member which, in turn, is driven by the main rotor; and determining the absolute steering wheel angle using output signals of the first and the second scanning units.

21. The method of claim 20, wherein the absolute steering wheel angle is within an interval of 0° to 360°.

22. The method of claim 20, wherein the absolute steering wheel angle is a multiple of an interval between 0° and 360°.

* * * * *